(12) United States Patent
Achard et al.

(10) Patent No.: US 8,662,792 B2
(45) Date of Patent: Mar. 4, 2014

(54) SEAT PORTION STRUCTURE FOR A HYDRAULIC TURBINE ENGINE

(75) Inventors: Jean-Luc Achard, Grenoble (FR); Thomas Jaquier, Grenoble (FR); Didier Imbault, Meylan (FR)

(73) Assignee: Institut Polytechnique de Grenoble, Grenoble Cedex (FR)

( * ) Notice: Subject to any disclaimer, the term of this patent is extended or adjusted under 35 U.S.C. 154(b) by 0 days.

(21) Appl. No.: 13/058,758

(22) PCT Filed: Aug. 11, 2009

(86) PCT No.: PCT/FR2009/051582
§ 371 (c)(1),
(2), (4) Date: May 3, 2011

(87) PCT Pub. No.: WO2010/018345
PCT Pub. Date: Feb. 18, 2010

(65) Prior Publication Data
US 2011/0206467 A1    Aug. 25, 2011

(30) Foreign Application Priority Data
Aug. 14, 2008  (FR) ...................................... 08 55593

(51) Int. Cl.
*E02D 5/54*   (2006.01)

(52) U.S. Cl.
USPC .............................. 405/224; 405/75; 405/229

(58) Field of Classification Search
USPC .......... 405/224, 229, 75, 76; 52/126.5, 126.6; 248/637, 678, 679; 60/398; 70/32, 33, 70/234, 235
See application file for complete search history.

(56) References Cited

U.S. PATENT DOCUMENTS

| | | | | |
|---|---|---|---|---|
| 3,961,490 A | * | 6/1976 | Corgnet | ......................... 405/202 |
| 4,580,926 A | * | 4/1986 | Bunnell et al. | ............. 405/195.1 |
| 5,332,336 A | * | 7/1994 | Lewis | ............................ 405/204 |
| 5,517,837 A | * | 5/1996 | Wang | .............................. 70/226 |

FOREIGN PATENT DOCUMENTS

WO       03/046375 A       6/2003

OTHER PUBLICATIONS

International Preliminary Report on Patentability and Written Opinion issued in PCT/FR2009/051582 on Apr. 12, 2011.
International Search Report issued in PCT/FR2009/051582 on Feb. 2, 2010.

* cited by examiner

*Primary Examiner* — Sean Andrish
(74) *Attorney, Agent, or Firm* — Vedder Price PC

(57) ABSTRACT

The instant disclosure relates to a seat portion structure for a ground-based hydraulic turbine engine. The seat portion structure includes a base plate. A first bearing element is connected to the base plate and contacts the ground. At least three arms are connected to the base plate by a pivoting link. The arms are adapted for pivoting relative to the base plate between a first position, in which the arms are placed near each other, and a second position, in which the arms radially extend from the base plate. A second bearing element is connected to one end of each arm and contacts the ground. A positioning device is adapted for changing the distance between the end of at least one arm and the associated second element. The structure includes, for each arm, a device for locking the arm in the second position.

11 Claims, 7 Drawing Sheets

SEAT PORTION STRUCTURE FOR A HYDRAULIC TURBINE ENGINE

FIELD OF THE INVENTION

The present invention relates to a seat portion or foundation structure on the sea bottom or on the bed of a river or a stream, for holding in position one or several hydraulic turbine engines, in particular a hydraulic turbine engine for supplying electricity by recovery of the energy of marine or river currents.

DISCUSSION OF PRIOR ART

Among natural non-polluting power sources, a currently rather unexploited power source corresponds to water currents naturally present on our planet, for example, high sea currents, tidal currents, strait and estuary currents, stream or river currents. Indeed, whilst hydroelectric power plants providing electric energy from the potential energy contained in an impoundment, for example, dams installed on streams or rivers, are widespread, devices supplying electric energy directly from the kinetic energy of marine or river currents are generally still currently at the stage of projects.

Even though sites which could be used for the supply of electric power from marine or river currents generally correspond to currents of low velocity, from 0.5 m/s to 6 m/s, the size of the sites and the large number of possible sites make such a power source particularly attractive. Indeed, from rivers to large ocean currents, the exploitable surface areas crossed by a current typically vary from 100 $m^2$ to 100 $km^2$, which corresponds, for a 2-m/s velocity, to respective theoretically recoverable powers ranging from 400 kilowatts to 400 gigawatts.

Devices for recovering and converting the kinetic energy of sea or river currents generally comprise a turbine comprising an assembly of blades adapted to rotate a shaft when they are immersed in the current. Among the different types of turbines, one can distinguish axial flow turbines for which the flow direction is parallel to the turbine rotation axis and cross-flow turbines for which the flow direction is inclined, and generally perpendicular with respect to the turbine rotation axis. An example of a cross-flow hydraulic turbine engine is described in patent FR2865777 filed by the applicant.

A general feature of hydraulic turbine engines is the presence of a drag force in the incident current direction. The drag force tends to sweep the hydraulic turbine engine away with the current and increases along with the extracted mechanical power. A seat or foundation structure thus has to be provided for the hydraulic turbine engine on the sea or river bed to resist the drag force. Peter Fraenkel's communication entitled "Tidal & Marine Current Energy" (Franco-British Marine Energies Seminar, Le Havre, Jan. 19-20, 2006) describes examples of hydraulic turbine engine foundation structures. Foundation structures may be distributed in five large groups, each having many variations:

(i) Piles: these are prefabricated (steel or concrete) elements which may be driven into the sea or river bed by piling or be installed by drilling. This type of foundation structure is reliable (good resistance to pulling out) and long-lasting. It however has several disadvantages. The drilling or piling operations necessary to install the piles are technically difficult, which limits exploitable depths to 40 m, while many interesting sites have deeper beds. Then, the bottom of the site where the foundation structure must be installed must have good geomechanical features, especially for the drilling. Finally, such foundation structures require the presence of underwater monitoring devices.

(ii) Suction anchors: these are hollow anchors having, for example, a cylindrical or trihedral shape. They are driven into the ground by pumping of the water inside of them. Such anchors may have a height ranging from up to 10 to 25 m with a diameter ranging from 3 to 7. The vacuum which forms inside makes the anchor difficult to pull off. The equipment necessary to install a suction anchor is simpler than that to be provided for a pile, since nothing but a pump is required to create vacuum inside of the anchor. This enables to consider the securing of hydraulic turbine engines at great depths. Suction anchors however remain difficult to install since a proper orientation and depressurization of the anchor have to be ensured. Further, suction anchors are heavy and bulky. They thus have a high installation cost (especially due to the transportation to the site) in common with piles. Further, like piles, suction anchors require specific grounds (sands, clays).

(iii) Gravity foundations: the hydraulic turbine engine is attached to a heavy body, for example, a strengthened concrete block or plate, which is placed at the bottom of the water. The hydraulic turbine engine attached to the heavy body is stabilized by its weight and by the friction exerted by the heavy body on the ground. This is also the operating principle of VLAs (Vertical Load Anchor), similar to boat anchors, which spontaneously penetrate into the ground due to their weight. A heavy body has a low manufacturing cost. However, transporting the heavy body to the installation site is expensive. Further, to install the heavy body, the sea or river bed of the installation site must be prepared, which may be difficult. Moreover, such heavy bodies do not respond well to horizontal loads and are further sensitive to scouring. Besides, VLAs require soft grounds.

(iv) Floating structures: such floating structures may be emerged, like oil drilling barges, or partly submerged. In all cases, they are moored to the bottom the water base plate by cables connected to anchoring systems which may correspond to the above-mentioned foundation structure examples. The holding of the floating structure must take into account the load due to the most dangerous waves. Accordingly, the floating structure and the associated anchoring systems must be oversized with respect to the nominal operating rate of the structure. Such a solution is thus expensive. Further, the use of cables and their mooring to the floating structure are a source of wearing and accidents due, in particular, to the vertical oscillations of the floating structure. Further, floating structures take up the sea surface (hindrance or incompatibility with the fishing or marine transportation activity, visual pollution, etc.).

(v) Anchored base plates: they are comprised of a plate comprising an upper surface and a lower surface. The floor or base plate is attached to an anchoring or foundation system on its lower surface side. The hydraulic turbine engine is attached to the upper surface of the base plate. The hydraulic turbine engine is thus indirectly connected to the anchoring or foundation system. The presence of the base plate has several advantages. First, it eases the design of the connection of the hydraulic turbine engine to the base plate (clamping, pin joint, etc.). Similarly, there is more liberty as to the anchoring or foundation system. Instead of a single anchoring system, for example, such as the foundation structures previously described at points (i), (ii), or (iii), the types of anchoring systems may be multiplied at the base plate periphery, and of smaller size. As an example, an embodiment of French patent FR2865777 describes hydraulic turbine engines which are attached to a common base plate, called a raised floor in this patent, itself connected to the bottom by cables attached to anchor studs. In patent GB2434413, a gravity solution is provided wherein a ballast system enables to set the horizontality of the base plate. However, although the use of a base plate enables to use smaller anchoring systems, the specific disadvantages of the installation of each of these anchoring systems remain.

SUMMARY

The present invention aims at a foundation structure for a hydraulic turbine engine comprising a base plate and which may adapt to a sea or river bed having any geomechanical features, for example, sands or clays, including beds having poor geomechanical features, for example, rocky beds or beds formed of cobbles or stones, or a bed having poor geometric features, for example, a non-planar bed, inclined with respect to Earth's gravity, having an uneven surface, etc.).

According to another object, the installation cost of the foundation structure is lower than or comparable to the cost of the actual turbine engine.

According to another object, the installation of the foundation structure is technically simple, fast, with no risk, and does not require heavy-duty technology or the presence of divers.

Thus, to achieve all or part of these and other objects, an embodiment of the present invention provides a foundation structure for at least one hydraulic turbine engine on a ground, comprising:
  a base plate comprising first and second opposite surfaces, said at least one turbine engine being intended to be arranged on the side of the first surface;
  a first bearing element connected to the second surface in central position and intended to be in contact with the ground;
  at least three arms, each arm comprising first and second opposite ends and being connected at its first end to the base plate by a pin joint, the arms being capable of pivoting with respect to the base plate between a first position in which the second ends are close to one another and a second position in which the arms extend radially from the base plate;
  for each arm, a second bearing element connected to the second end and intended to be in contact with the ground;
  for at least one arm, a positioning device capable of modifying the distance between the second end and the second associated bearing element; and
  for each arm, a device for locking the arm in the second position.

According to an embodiment of the invention, the positioning device comprises a double-acting jack connecting the second end of the arm to the second associated bearing element.

According to an embodiment of the invention, the double-acting jack is oriented perpendicularly to the axis of the arm.

According to an embodiment of the invention, the foundation structure comprises a platform having third and fourth opposite surfaces, said at least one turbine engine being intended to be attached to the third surface, the fourth surface being opposite to the first surface of the base plate, the platform being capable of pivoting with respect to the base plate around an axis perpendicular to the first surface.

According to an embodiment of the invention, at least one bearing element from among the first bearing element and the second bearing elements corresponds to a mooring having a weight greater than 500 kilograms or to a suction anchor.

According to an embodiment of the invention, at least one bearing element from among the first bearing element and the second bearing elements comprises an elongated and/or pointed portion intended to be in contact with the ground.

According to an embodiment of the invention, the locking device comprises a deformable portion, a lock, and a stop element resting on said deformable portion, the associated arm bearing against the stop element and compressing said deformable portion in the second position, the stop element being capable of locking the lock when the arm is not in the second position and being capable of releasing the lock when the arm is in the second position, the arm being sandwiched between the lock and the stop element in the second position.

According to an embodiment of the invention, the first bearing element is connected to the second surface by a ball joint.

According to an embodiment of the invention, the foundation structure comprises, for each arm, a device for damping the pivoting of the arm from the first position to the second position.

An embodiment of the present invention also provides a method for installing the foundation structure such as defined hereabove. The method comprises the steps of:
  bringing the foundation structure to the ground level, the arms being in the first position;
  pivoting the arms from the first to the second position;
  bringing the second bearing elements into contact with the ground, the first bearing element already being in contact with the ground; and
  setting the horizontality of the base plate via positioning devices and a system for measuring the horizontality of the base plate.

BRIEF DESCRIPTION OF THE DRAWINGS

The foregoing and other objects, features, and advantages of the present invention will be discussed in detail in the following non-limiting description of specific embodiments in connection with the accompanying drawings, among which.

DETAILED DESCRIPTION

Figure 1:
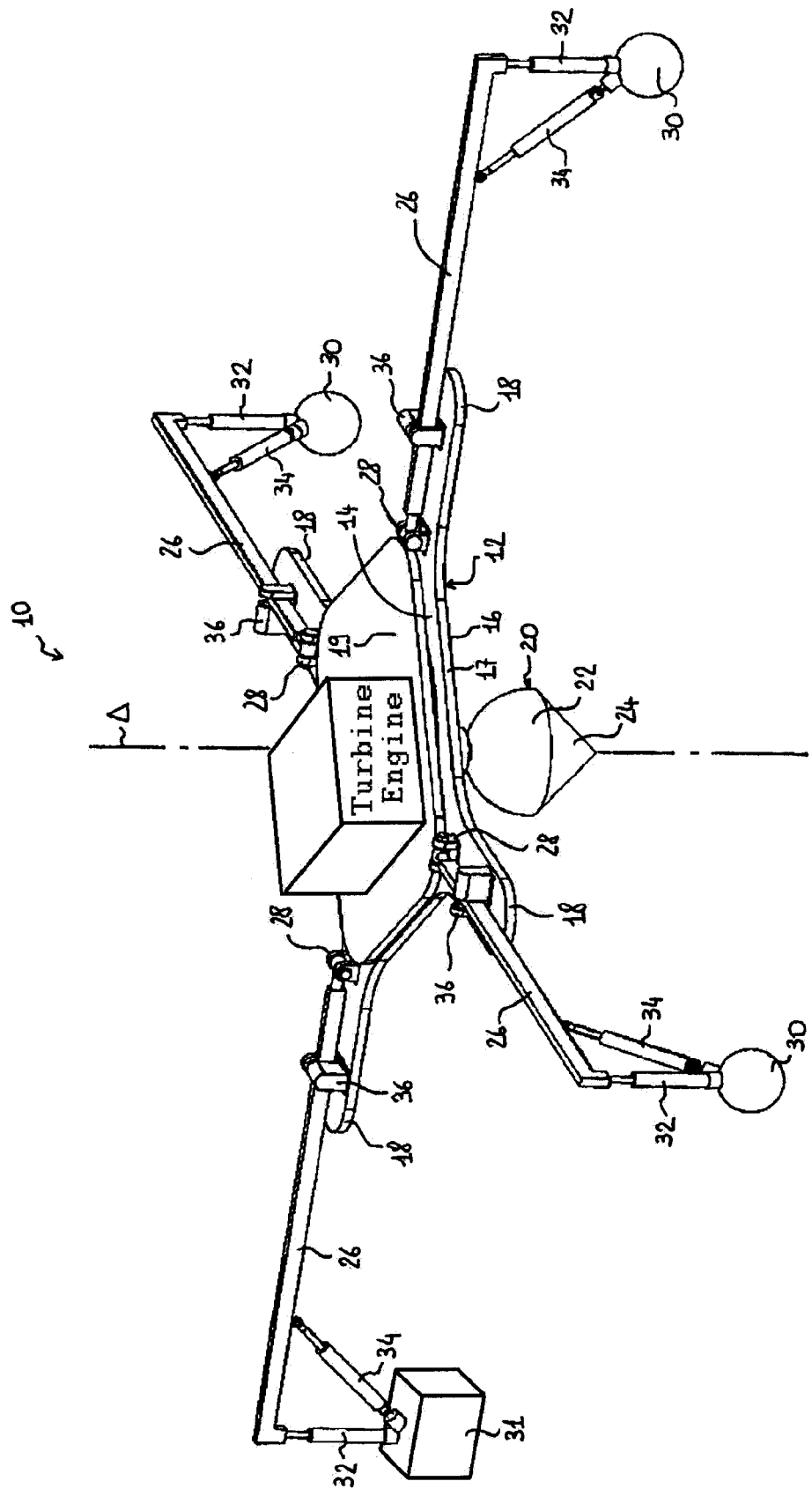
FIG. 1 is a perspective view of an embodiment of a foundation structure according to the invention once installed on a sea or river bed.

For clarity, the same elements have been designated with the same reference numerals in the different drawings and, further, only those elements which are useful to the understanding of the present invention will be described.

Figure 2:
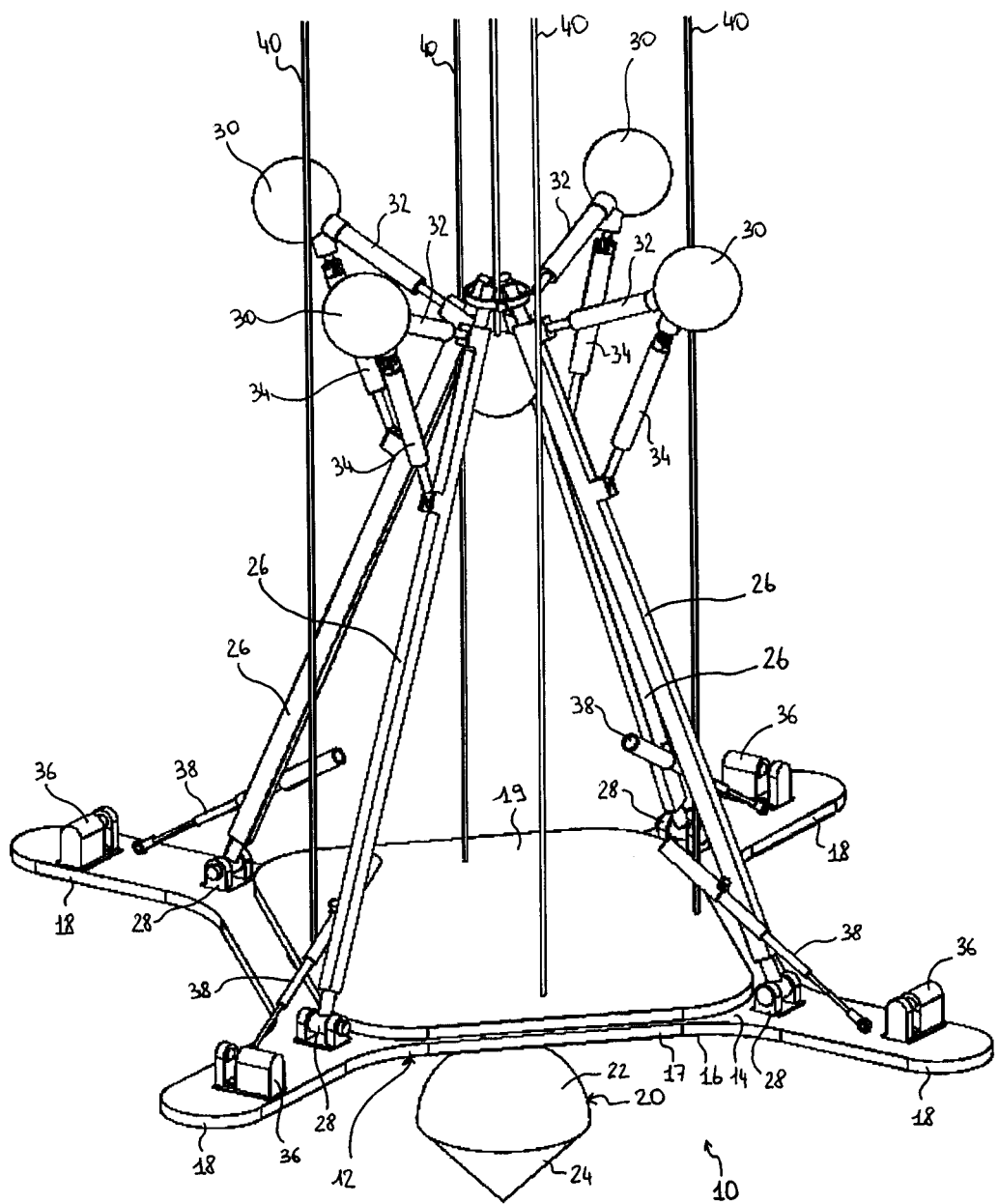
FIG. 2 is a perspective view of the foundation structure of FIG. 1 before an installation operation.

FIGS. 1 and 2 show an embodiment of a foundation structure 10 according to the invention. In FIG. 1, foundation structure 10 is shown in a configuration of use where it is arranged at the level of a sea or river bed, not shown in FIGS. 1 and 2. In FIG. 2, foundation structure 10 is shown in a storage configuration at the beginning of an operation of installation of foundation structure 10 on the sea or river bed.

Foundation structure 10 comprises a base plate 12 having parallel upper and lower surfaces 14 and 16, with lower surface 16 facing the ground. Base plate 12 may be made of stainless steel or of aluminum. In the present embodiment, base plate 12 comprises a rectangular central planar plate 17 which extends at its four corners in elongated portions 18 coplanar with central plate 17. As a variation, central plate 17 of base plate 12 may have a circular shape. A platform 19 is connected to upper surface 14 of base plate 12. Platform 19 for example substantially entirely covers plate 17. Platform 19 is intended to receive one or several hydraulic turbine engines, not shown. Call main axis of base plate 12 the axis Δ perpendicular to surfaces 14 and 16 and running through the center of gravity of base plate 12. In the present embodiment, main axis Δ corresponds to an axis of symmetry of base plate 12. As an example, central plate 17, which, advantageously, may be strengthened by ribs radiating on lower surface 16, is inscribed within a circle having a diameter of several meters, for example, a diameter of some ten meters, and has a thickness of several centimeters, for example, some ten centimeters.

A central mooring 20, for example, made of concrete or of steel, is connected to lower surface 16 of base plate 12. Central mooring 20 is intended to be placed against the sea or river bed and possibly to partially sink into the sea or river bed. Central mooring 20 has a shape with a symmetry of revolution having lateral dimensions smaller than those of central plate 17 of base plate 12. As an example, for a base plate 12 having its central plate 17 inscribed within a circle of some ten meters, the lateral dimension of central mooring 20 is smaller than 2 or 3 meters. The weight of central mooring 20 especially depends on the weight and on the dimensions of the hydraulic turbine engine(s) intended to be connected to platform 19. As an example, the weight of central mooring 20 may be on the order of several tons. Advantageously, the axis of revolution of central mooring 20 is substantially perpendicular to the ground. In the present embodiment, central mooring 20 comprises a hemispherical portion 22 which extends in a conical portion 24 having its tip directed towards the ground. When the ground can be assimilated to a planar surface perpendicular to the direction of Earth's gravity, the axis of revolution of mooring 20 coincides with the main axis of base plate 12. As a variation, central mooring 20 may have a spherical shape, a tetrapod shape, or may be replaced with a suction anchor.

Foundation structure 10 comprises arms 26 on the periphery of base plate 12 which, in the operating configuration, extend radially with respect to base plate 12, in line with elongated portions 18 of base plate 12. Each arm 26 corresponds, for example, to a stainless steel or aluminum and may advantageously be strengthened by a lattice structure. The length of each arm 26 may vary between the value of a characteristic dimension of base plate 12, for example, the radius of central plate 17, and ten times this dimension. Each arm 26 is connected, at one end, to base plate 12 via a pin joint 28 provided on upper surface 14 of base plate 12 at the level of one of elongated portions 18. Pin joint 28 enables the associated arm 26 to pivot in a plane perpendicular to upper surface 14 of base plate 12 and containing the main axis of base plate 12 between a folded position, shown in FIG. 2, and a deployed position, shown in FIG. 1. Each arm 26 is connected to a peripheral heavy body 30 at its end opposite to base plate 12. More specifically, peripheral heavy body 30 is connected to the free end of the associated arm 26 by a positioning device 32 and by a strengthening device 34, as will be discussed in further detail hereafter. Each peripheral heavy body 30 is, for example, made of concrete or of steel and has a shape which may be spherical. The weight of each peripheral heavy body 30 especially depends on the number and on the length of arms 26, and on the dimensions and on the weight of the hydraulic turbine engine(s) intended to be connected to platform 19. As an example, each peripheral heavy body 30 has a weight greater than 500 kilograms, preferably on the order of from one to two tons. Base plate 12 comprises, for each arm 26, a locking device 36, arranged on surface 14 of base plate 12 at the level of elongated portion 18 associated with arm 26. Locking device 36 is capable of locking the associated arm 26 in the deployed position shown in FIG. 1. Further, as can be seen in FIG. 2, a damping device 38 connects each arm 26 to base plate 12.

Figure 3A:
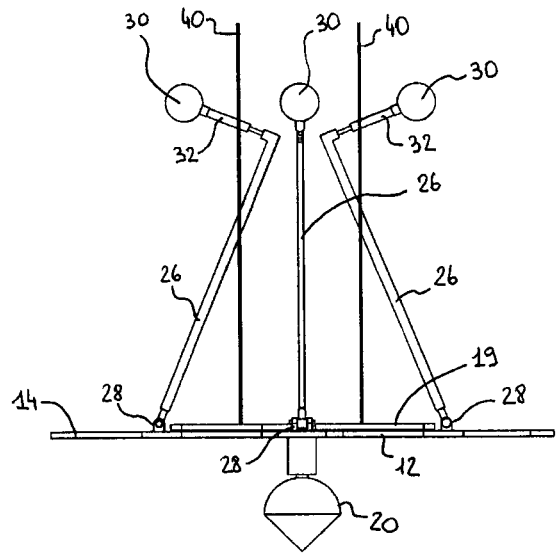
FIGS. 3A to 3C are three simplified side views of the foundation structure of FIG. 1 at successive steps of an installation operation.
Figure 3B:
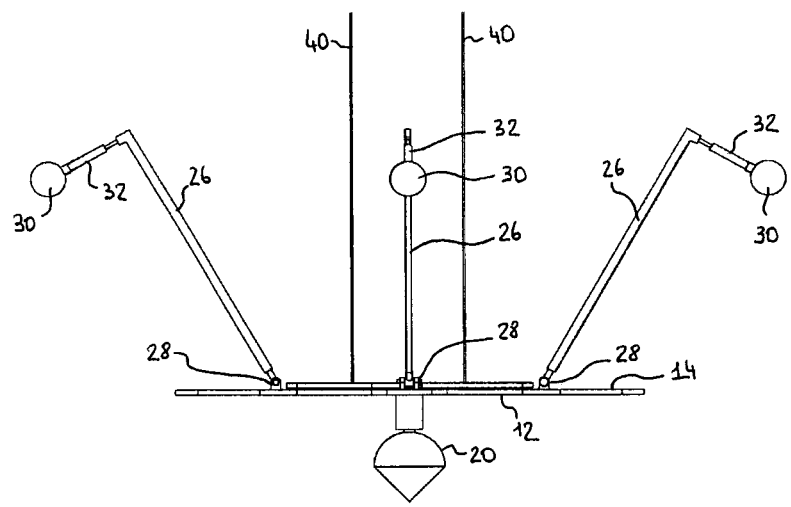
Figure 3C:
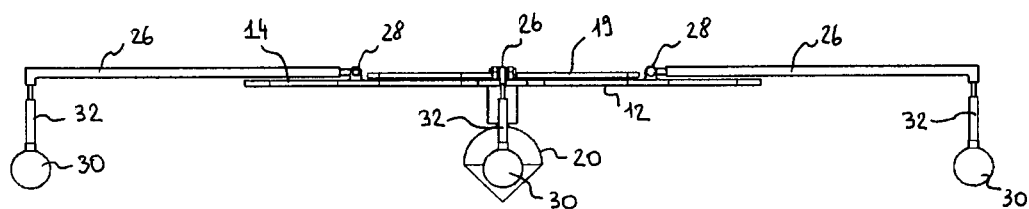

FIGS. 3A to 3C are partial side views of foundation structure 10 of FIGS. 1 and 2 at three successive steps of an operation of installation of foundation structure 10 on a sea or river bed.

At the beginning of the installation, base plate 12 is held in a substantially horizontal configuration by chains 40 and lowered down to the sea or river bed. For an installation on a sea bed, foundation structure 10 may be transported to the site by boat and be lowered down to the sea bed from the boat. For an installation on a river bed, foundation structure 10 may also be lowered down to the river bed by a crane located on the bank when the installation site allows it.

During the transportation and the lowering of foundation structure 10 down to the sea or river bed, arms 26 are in folded position and the ends of arms 26, provided with peripheral heavy bodies 30, are joined and held in a "bunch", as shown in FIG. 2, and as will be discussed in further detail hereafter. Once central mooring 20 approaches or reaches the ground, arms 26 are freed (FIG. 3A). Under the effect of peripheral heavy bodies 30, arms 26 tilt and place themselves flat against the ground after having followed a circular trajectory, as illustrated in FIGS. 3B and 3C. When arms 26 have opened all the way to their deployed position, that is, in a direction parallel to surface 14 of base plate 12, they are definitively locked in this position by locking devices 36, not shown in FIGS. 3A to 3C. Arms 26 then extend radially along the circumference of base plate 12 along a general direction substantially parallel to surface 14 of base plate 12. Chains 40 may be removed before or after the tilting of arms 26.

The installation of foundation structure 10 on the ground then carries on with the setting of the positions of peripheral heavy bodies 30 via positioning devices 32. Indeed, each positioning device 32 enables to modify the distance between the free end of arm 26 and the associated peripheral heavy body 30. The actuating of positioning device 32 thus enables to position the end of arm 26 at the desired height when the associated peripheral heavy body 30 lies on the ground. By modifying the height of the ends of each of arms 26 of foundation structure 10, the orientation of base plate 12 with respect to Earth's gravity, and thus with respect to the flow, can be set. When foundation structure 10 is placed on an uneven, non-horizontal ground, etc. positioning devices 32 provide for the horizontality of base plate 12 and thus for the right positioning of the hydraulic turbine engine which will be assembled on platform 19. At the beginning of the installation of foundation structure 10, positioning devices 32 are set so that each peripheral mooring 30 is at a smaller distance from base plate 12, measured from main axis Δ, than the distance separating central heavy body 20 from base plate 12. Once peripheral moorings 30 are placed against the ground and the orientation of base plate 12 has been adjusted, at least one hydraulic turbine engine may be connected to platform 19. After the assembly of the hydraulic turbine engine, a new setting of the orientation of base plate 12 may be necessary. Further, the orientation of base plate 12 may be regularly measured and adjusted if necessary during the hydraulic turbine engine operation. During the operation of the hydraulic turbine engine, the stress exerted by locking devices 36 which prevent the pivoting of arms 26 opposes the tilting stress generated by the drag forces exerted on the turbine engine.

On installation of foundation structure 10, a system for measuring the horizontality of base plate 12 may be provided. Such a system comprises, for example, placing one or several inclinometers on one of surfaces 14 or 16 of base plate 12. These are, for example, inclinometers sold by Geomecanics and Sensorex companies. This system enables to avoid the need for a visual control, from the surface or by a diver, of the installation of foundation structure 10. The installation of foundation structure 10 can thus be easily performed at significant depths. Such inclinometers may transmit signals to the surface via electric wires or a radio transmitter. Such signals can then be used to control positioning devices 32. As a variation, an unattended orientation system may be placed on base plate 12 to automatically process the signals provided by the inclinometers and to actuate positioning devices 32 according to these signals. The unattended orientation system thus enables to automatically set the horizontality of base plate 12, with no external intervention.

The fact for arms 26 to be pivotally connected to base plate 12 enables to maintain, before the installation, arms 26 in a folded position, in which the free ends of arms 26 are assembled in a bunch. Further, when arms 26 are in folded position, each positioning device 32 is in the configuration for which peripheral mooring 30 is at its closest to the end of the associated arm 26. This decreases the total bulk of foundation structure 10 during its transportation 10, for example, by boat, and during its lowering down to the installation site. Once arms 26 are deployed, peripheral moorings 30 are distributed around base plate 12 and distant from base plate 12 by the distance of arms 26. This enables to obtain significant loads which efficiently oppose the loads which tend to tilt the hydraulic turbine engine, while decreasing the weight of peripheral moorings 30. A foundation structure 10 of decreased weight is thus obtained, which decreases its cost of transportation and installation.

Figures 4, 5:
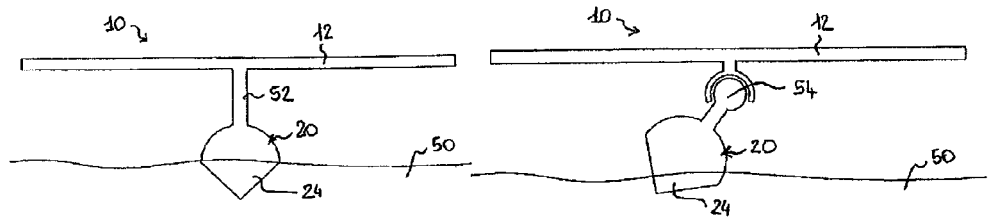
FIGS. 4 and 5 are partial simplified views illustrating two embodiments of the connection between the base plate and the central mooring of the foundation structure of FIG. 1.
Figures 6A, 6B:
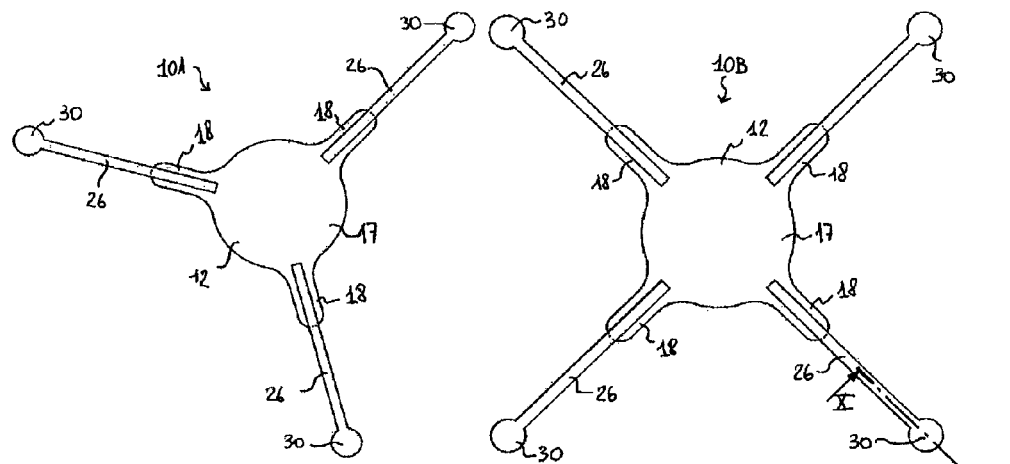
FIGS. 6A to 6D are partial simplified top views of embodiments of foundation structures provided with an increasing number of arms.
Figures 6C, 6D:
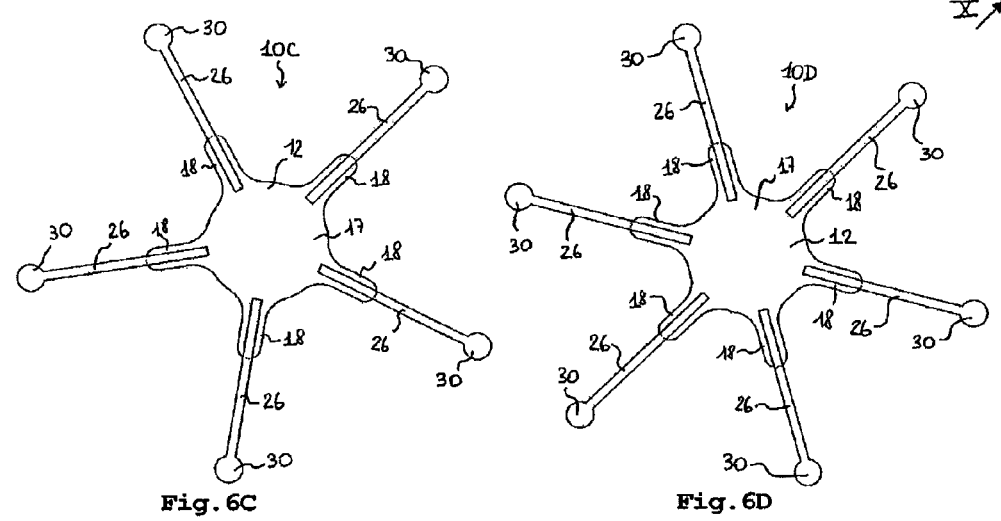

FIGS. 4 and 5 are simplified cross-section views only showing base plate 12 and central mooring 20 of two examples of foundation structure 10. Conical portion 24 of central mooring 20 may have an elongated shape to ease a possible penetration into ground 50 on installation of foundation structure 10. In FIG. 4, central mooring 20 is connected to base plate 12 by a rigid connection 52. Such a rigid connection 52 is adapted to the case where central mooring 20 does not or only slightly penetrates into ground 50, the latter being for example too rigid, or in the case where the axis of revolution of central mooring 20, when it penetrates into ground 50, remains aligned with the gravity direction. In FIG. 5, central mooring 20 is connected to base plate 12 by a ball joint 54 to enable to set the horizontality of base plate 12 independently from the orientation of central mooring 20. This is advantageous in the case where central mooring 20 comes to a standstill with respect to ground 50 along a direction which does not correspond to the gravity direction. Ball joint 54 corresponds, for example, to the ball joint sold under trade name Eternum by Eternum France. Such a ball joint 54 has a stainless steel body and a composite spacer, which enables it to operate in (fresh or salt) water with no need to provide tightness means.

FIGS. 6A to 6D show examples of foundation structures 10A, 10B, 10C, and 10D which differ from one another by the number of arms 26. In these embodiments, central plate 17 of base plate 12 is circular. The foundation structure 10A shown in FIG. 6A comprises three arms 26 which extend radially from base plate 12, each arm 26 being, for example, angularly shifted by 120 degrees with respect to the other arms. Foundation structure 10A is rather adapted to a one-way current, for example, to a stream current, two of arms 26 being advantageously placed symmetrically upstream of base plate 12. The foundation structure 10B shown in FIG. 6B comprises four arms 26. Advantageously, foundation structure 10B comprises at least one plane of symmetry perpendicular to surfaces 14, 16 of base plate 12. Each arm 26 is, for example, angularly shifted by 90° with respect to the adjacent arms. Foundation structure 10B is compatible with a two-way monodirectional tidal current. In this case, the plane of symmetry of foundation structure 10B is advantageously arranged to be substantially parallel to the direction of the current. Foundation structures 10C and 10D respectively shown in FIGS. 6C and 6D respectively comprise five and six arms 26. A number of arms greater than or equal to 5 enables to do away with the foundation structure orientation constraints and thus enables to place the foundation structure with a random positioning with respect to the current.

Figure 7:
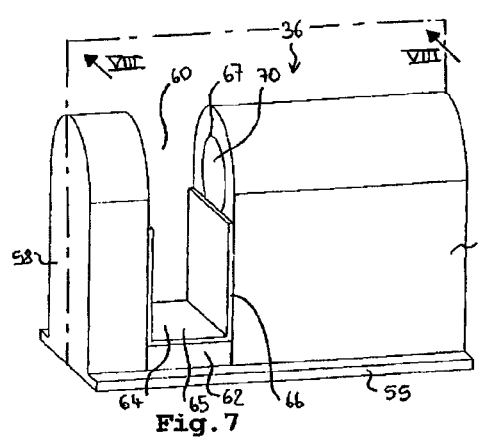
FIGS. 7 and 8 respectively are a perspective view and a cross-section view of the device for locking an arm of the foundation structure of FIG. 1.
Figure 8:
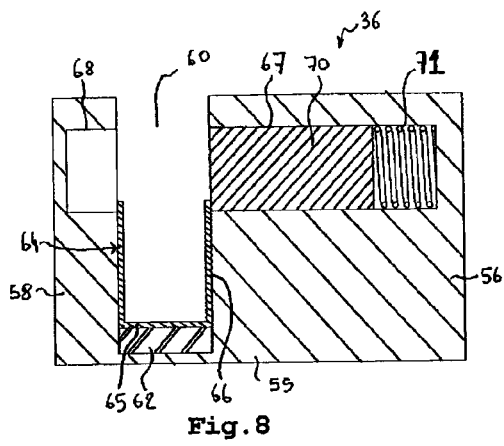

FIG. 7 is a perspective view of locking device 36 and FIG. 8 is a cross-section view of the device of FIG. 7 along a median plane of device 36 perpendicular to surface 14 of base plate 12. Locking device 36 is, in the present embodiment, a "spring lock" system. It comprises a sub-plate 55, assembled on upper surface 14 of base plate 12, from which two blocks 56, 58 separated by an opening 60 are projecting. The portion of sub-plate 55 which forms the bottom of opening 60 is covered with a layer 62 of a flexible material. It for example is a foam, a rubber, a flexible polymer, etc., for example, of a synthetic polychloroprene-based rubber, for example, the product sold by Dupont Chemicals under trade name Neoprene. A "U"-shaped plate 64 comprising a base 65 and lateral walls 66 is arranged in opening 60, with base 65 resting on layer 62 of the flexible material. The spacing between lateral walls 66 is slightly greater than the width of an arm 26. Plate 64 is capable of sliding in opening 60. A cylindrical hole 67 is provided in block 56 and emerges into opening 60. A cylindrical hole 68 is provided in block 58 and emerges into opening 60. Hole 68 is arranged to be coaxial to hole 67. A cylindrical rod 70 is arranged in hole 67. A spring 71 is interposed between cylindrical rod 70 and the bottom of hole 67. In the absence of an external load on plate 64, said plate is raised by layer 62 of the flexible material so that one of lateral plates 66 at least partly closes hole 67. Cylindrical rod 70 is then maintained in hole 67 between lateral plate 66 and spring 71 that it compresses.

Locking device 36 is placed on the trajectory of the associated arm 26 and is shifted outwards with respect to joint 28 of arm 26 so that when the axis of arm 26 is parallel to upper surface 14 of base plate 12, arm 26 bears against base 65 of plate 64. The weight of arm 26 compresses layer 62 of the flexible material and lowers plate 64 by a few centimeters. The displacement of plate 64 enables to release cylindrical rod 70, which was blocked by plate 64 until then. Under the thrust of spring 71, cylindrical rod 70 axially translates to eventually penetrate into hole 68. Arm 26 is thus locked between base plate 12 and cylindrical rod 70.

Figure 9:
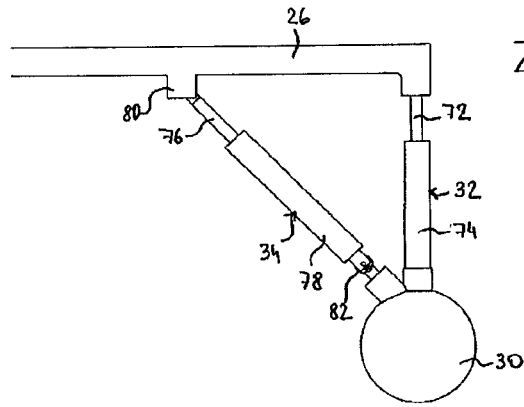
FIGS. 9 and 10 respectively are a side view and a cross-section view of the connection between one of the arms and the peripheral mooring associated with the foundation structure of FIG. 1.
Figure 10:
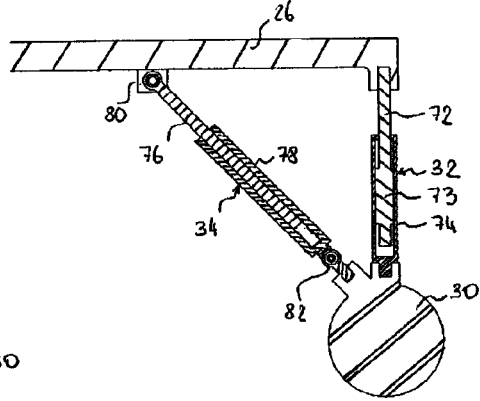

FIGS. 9 and 10 respectively are a side view and a lateral cross-section view of the free end of an arm 26. Peripheral heavy body 30 is connected to the end of arm 26 by the associated positioning device 32 and strengthening device 34. Positioning device 32 corresponds, for example, to a double-acting jack comprising a rod 72 attached to a piston 73 capable of sliding in a cylindrical tube 74. Rod 72 is attached to the free end of arm 26 and cylindrical tube 74 is attached to heavy body 30. As an example, the axis of jack 32 is oriented perpendicularly to the axis of arm 26. Jack 32 may correspond to an electric, pneumatic, or hydraulic double-acting jack. The maximum length reachable by jack 32 is defined according to the relief of the site. Each double-acting jack 32 may be actuated by an actuating system, not shown. As an example, jacks 32 may be actuated from the surface by means of electric cables or ducts running from jacks 32 to the surface, or directly from an energy source present at the level of foundation structure 10. When it is not actuated, jack 32 is immobilized in both displacement directions of rod 72 by a mechanical system requiring no power. This may for example be a locking system sold by Sitema Company under trade named Serra.

Strengthening device 34 corresponds, for example, to a jack with a pitch of approximately 45 degrees with respect to the axis of arm 26. It comprises a rod 76 capable of sliding in a cylindrical tube 78. Rod 76 is connected to arm 26 by a pin or ball joint 80 and cylindrical body 78 is connected to heavy body 30 by a pin or ball joint 82. Jack 34 strengthens the end area of arm 26. This enables to decrease the cross-section of the beam forming arm 26. It is possible for jack 34 not to be a controlled jack. On setting of the spacing between the end of arm 26 and the associated peripheral mooring 30 by the control of double-acting jack 32, it then keeps its liberty of translation. Jack 34 is then blocked, for example, by means of a Serra-type device.

Figure 11A:
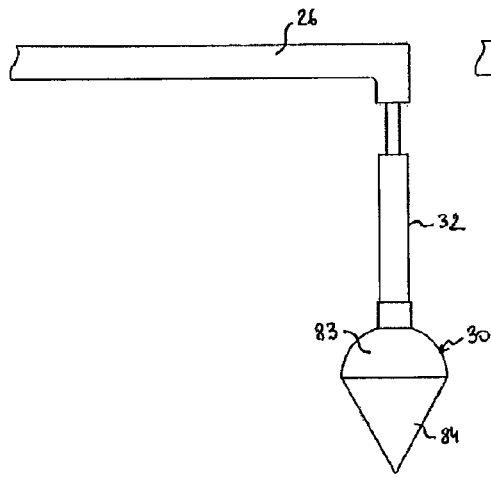
FIGS. 11A and 11B are side views illustrating two embodiments of the peripheral mooring of the foundation structure of FIG. 1.
Figure 11B:
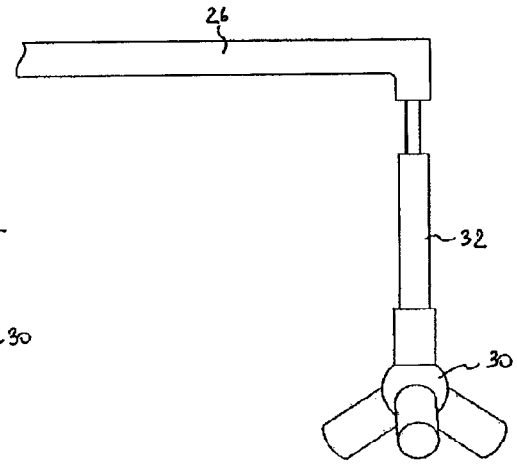

FIGS. 11A and 11B schematically illustrate embodiments of peripheral heavy body 30. Strengthening devices 34 are not shown in these drawings. In FIG. 11A, peripheral heavy body 30 comprises a hemispherical portion 83 which extends in a conical portion 84 having its tip directed towards the ground. This allows a possible partial penetration of peripheral heavy body 30 into the sea or river bed on setting of the position of peripheral heavy body 30 by the associated positioning device 32. In FIG. 11B, peripheral heavy body 30 is tetrapod-shaped. Generally, the shape of each peripheral heavy body 30 and the surface state of this body enables to increase, for a given weight, the friction with the ground to more efficiently oppose the drag in the flow direction. The surface of peripheral heavy body 30 may be rough, or covered with asperities, or again provided with one or several protrusions having a characteristic dimension that may be comparable to the dimension of the actual body, like the tetrapod shape of FIG. 11B. These features also apply to central heavy body 20.

According to another embodiment, peripheral heavy bodies 30 or at least some of them are replaced with suction anchors 31 (generically illustrated in FIG. 1) to decrease the weight of foundation structure 10.

Figure 12:
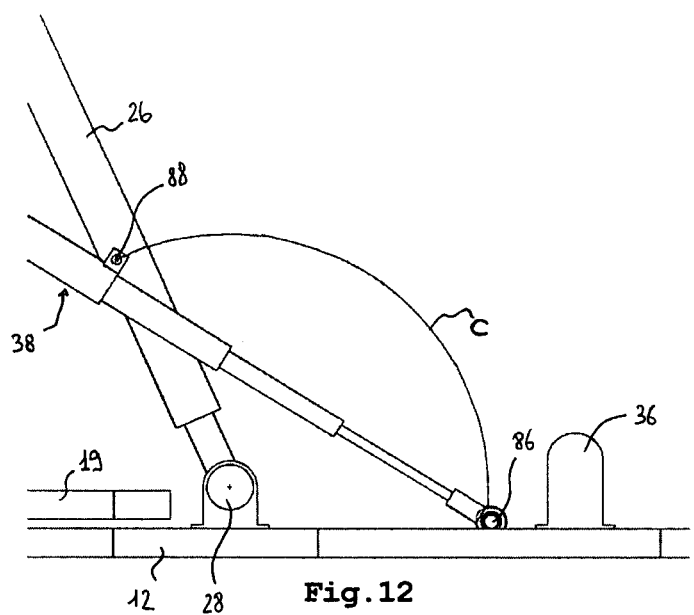
FIG. 12 is a side view of a detail of the damping device of the foundation structure of FIG. 2.

FIG. 12 shows damping device 38 in further detail. It may be a telescopic device connected by a pin or ball joint 86 to base plate 12 and by another pin or ball joint 88 to the associated arm 26. It may be a device based on the pressure loss of a fluid circulating in a closed enclosure. Damping devices 38 avoids excessively violent shocks when arms 26 tilt and come into contact with plate 64 of locking device 36 resting on base plate 12. Curve C shows the trajectory followed by pin joint 88 in the tilting of arms 26.

Figure 13:
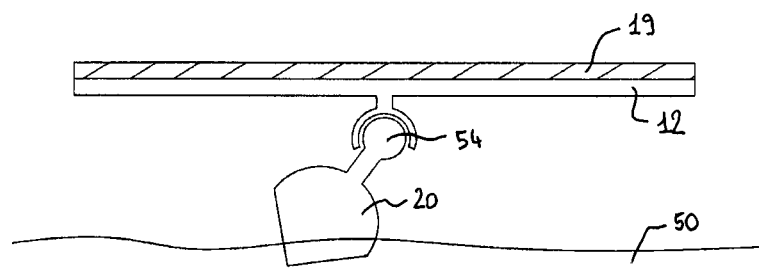
FIGS. 13 and 14 are partial simplified views illustrating two embodiments of the connection between a hydraulic turbine engine support platform and the base plate of the foundation structure of FIG. 1.
Figure 14:
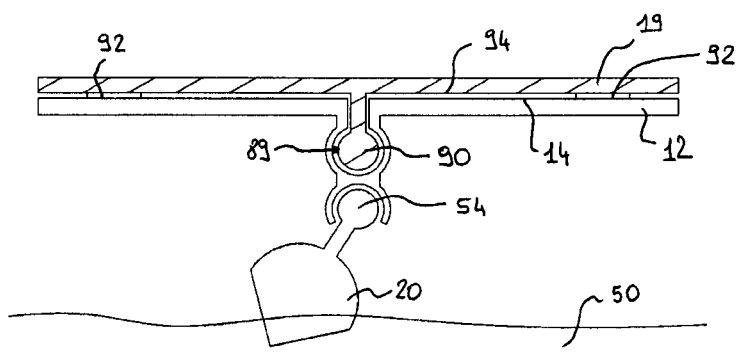

FIGS. 13 and 14 schematically illustrate two examples of connection between platform 19 and base plate 12. Platform 19 supporting the turbine engine comprises male or female parts, not shown, enabling to attach one or several turbine engines by jointing. As shown in FIG. 13, platform 19 may be solidly attached to base plate 12. In this case, platform 19 and base plate 12 may correspond to a same part. Platform 19 of FIG. 13 is adapted to the case where the turbine engine to be installed does not comprise means facilitating its installation according to the direction of the current or where it is not sensitive to the orientation of the current. As shown in FIG. 14, platform 19 may be connected to base plate 12 via a connection 89 which allows, for example, a rotation of platform 19 around the central axis of base plate 12. Connection 89 is for example comprised of an Eternum ball joint 90 connecting platform 19 to base plate 12, located under base plate 12 above ball joint 54 of central mooring 20, and by a planar connection element 92 between lower surface 94 of platform 19 and upper surface 14 of base plate 12. Platform 19 of FIG. 14 enables the hydraulic turbine engine assembled on platform 19 to be freely oriented with respect to the current. This is advantageous in the case where the turbine engine comprises means which facilitate its orientation according to the direction of the current.

Figure 15:
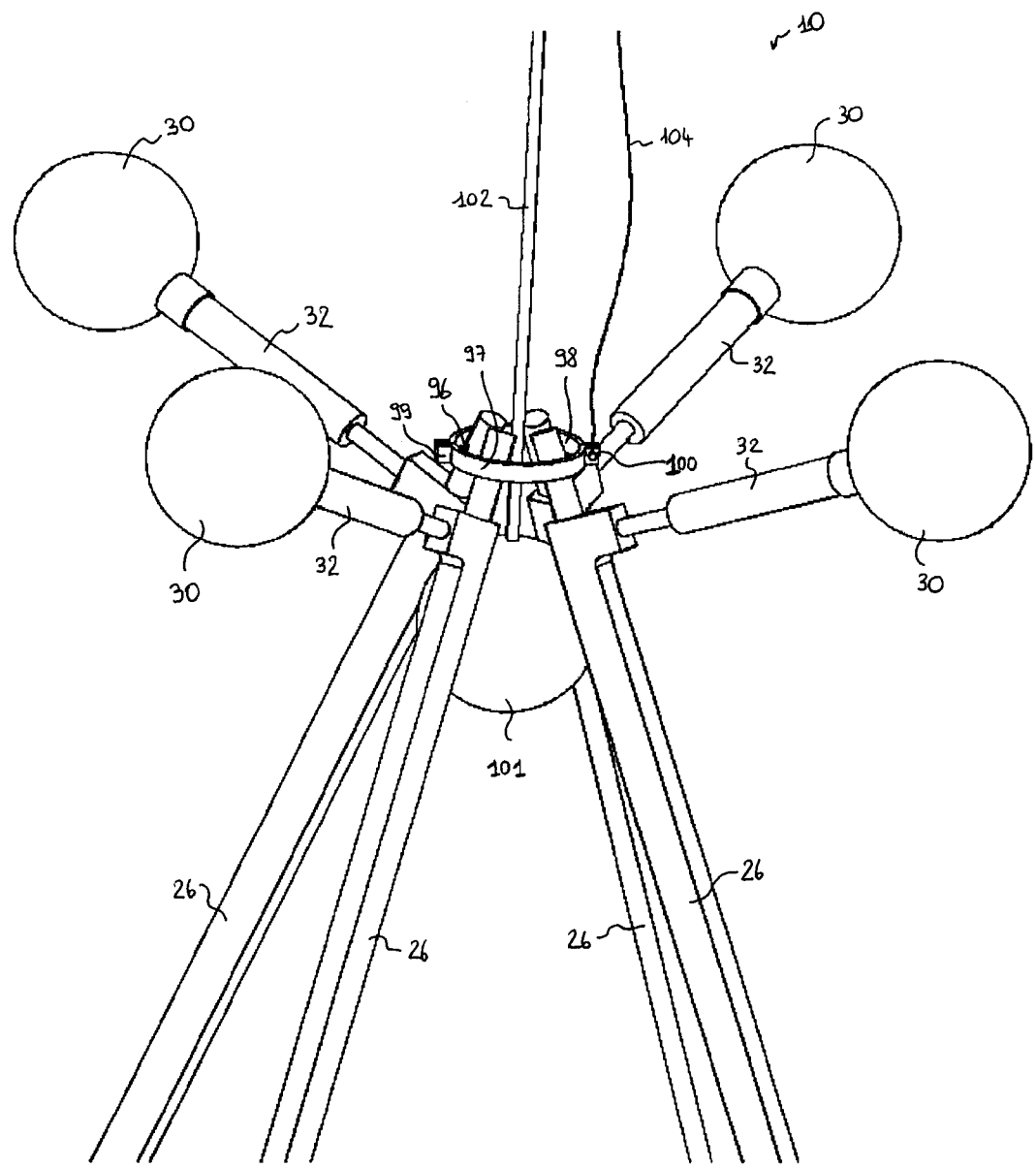
FIG. 15 is a view of a detail of FIG. 2 illustrating the system for maintaining the arms of the foundation structure in folded position.

FIG. 15 is a view of a detail of FIG. 2 and shows the free ends of arms 26 of foundation structure 10 in a folded configuration at the beginning of an operation of installation of foundation structure 10 on a sea or river bed. Strengthening devices 34 are not shown in FIG. 15. An elastic hoop 96 surrounds the free ends of arms 26. Hoop 96 comprises two semi-cylindrical portions 97, 98 connected at one end by a deformable connection 99. Semi-cylindrical portions 97, 98 are attached to each other at the opposite end by a pin 100. The folded position of arms 26 corresponds to a stable equilibrium position. However, in the transportation of foundation structure 10 and the lowering of foundation structure 10 down to the installation site, disturbances such as current variations, various shocks, etc. might cause an incidental deployment of arms 26. Hoop 96 is provided as a security and holds arms 26 in folded position. For the lowering of foundation structure 10 down to the installation site, an inflatable balloon 101 is arranged between arms 26 under hoop 96 in a partially inflated state. A gas supply duct 102 is connected to balloon 101. When central mooring 20 of foundation structure 10 approaches or reaches the sea or river bed, pin 100 is removed via a cable 104 and balloon 101 is inflated via duct 102. Balloon 101 exerts a thrust on arms 26, especially due to buoyancy. This results in spacing apart arms 26 which are no longer maintained by hoop 96, all the way to an imbalance position at which peripheral moorings 30 cause the tilting of arms 26. Balloon 101 is then released and can be recovered. As a variation, inflatable balloon 101 may be replaced with a rigid balloon, the spacing of arms 26 being obtained by pulling the rigid balloon upwards, for example, via a cable.

Specific embodiments of the present invention have been described. Various alterations and modifications will occur to those skilled in the art. In particular, although, in the previously-described examples, each arm 26 is formed by a "monoblock" beam jointed with respect to base plate 12, it should be clear that the arm may have a different structure. For example, each arm may have a telescopic structure while being jointed to base plate 12. Each arm then is in a configuration where it is folded and where its length is minimum for the transportation of the foundation structure and the lowering of the foundation structure down to the installation site and is brought to a configuration where its length is maximum on installation of the foundation structure just before the arm is tilted. This enables to still further decrease the bulk of the seat structure during its transportation.

The invention claimed is:

1. A foundation structure for at least one hydraulic turbine engine on a ground, comprising:
   a hydraulic turbine engine;
   a base plate comprising first and second opposite surfaces, said at least one turbine engine attached to the base plate on the first surface;
   a first bearing element connected to the second surface at a position where an axis perpendicular to the second surface runs through a center of gravity of the base plate and adapted to be in contact with the ground;
   at least three arms, each of the at least three arms comprising first and second opposite ends and being connected at said first end to the base plate by a pin joint, the at least three arms being capable of pivoting with respect to the base plate between a first position in which the second ends are close to one another and a second position in which the arms extend radially from the base plate;
   each of the at least three arms comprising a second bearing element connected to the respective second end and adapted to be in contact with the ground;
   at least one of the at least three arms comprising a positioning device capable of modifying a distance between the respective second end and the second associated bearing element; and
   each of the at least three arms comprising a device for locking the respective arm in the second position.

2. The foundation structure of claim 1, wherein the positioning device comprises a double-acting jack connecting the second end of the at least one arm to the second associated bearing element.

3. The foundation structure of claim 2, wherein the double-acting jack is oriented perpendicularly to a longitudinal axis of the at least one arm.

4. The foundation structure of claim 1, comprising a platform having third and fourth opposite surfaces, said at least one turbine engine being adapted to be attached to the third surface, the fourth surface being opposite to the first surface of the base plate, the platform being capable of pivoting with respect to the base plate around an axis perpendicular to the first surface.

5. The foundation structure of claim 1, wherein at least one bearing element from among the first bearing element and the second bearing elements corresponds to a mooring having a weight greater than 500 kilograms or to a suction anchor.

6. The foundation structure of claim 1, wherein at least one bearing element from among the first bearing element and the second bearing elements comprises at least one of an elongated portion and a pointed portion intended to be in contact with the ground.

7. The foundation structure of claim 1, wherein the locking device comprises:
   a deformable portion;
   a lock; and
   a stop element resting on said deformable portion, the associated arm bearing against the stop element and compressing said deformable portion in the second position, the stop element releasing the lock when the associated arm is in the second position, the associated arm being sandwiched between the lock and the stop element in the second position.

8. The foundation structure of claim 1, wherein the first bearing element is connected to the second surface by a ball joint.

9. The foundation structure of claim 1, wherein each of the at least three arms further comprises a device for damping the pivoting of the arm from the first position to the second position.

10. A method for installing the foundation structure of claim 1, comprising the steps of:
    bringing the foundation structure to the ground level, the arms being in the first position;
    pivoting the arms from the first to the second position;
    bringing the second bearing elements into contact with the ground, the first bearing element already being in contact with the ground; and
    setting the horizontality of the base plate via positioning devices and a system for measuring the horizontality of the base plate.

11. A foundation structure for at least one hydraulic turbine engine on a ground, comprising:
    a base plate comprising first and second opposite surfaces, said at least one turbine engine being adapted to be arranged on the first surface;
    a first bearing element connected to the second surface at a position where an axis perpendicular to the second surface runs through a center of gravity of the base plate and adapted to be in contact with the ground;
    at least three arms, each of the at least three arms comprising first and second opposite ends and being connected at said first end to the first surface of the base plate by a pin joint, the at least three arms being capable of pivoting with respect to the base plate between a first position in which each of the at least three arms is disposed above the first surface and a second position which each of the at least three arms extend radially from and parallel to the base plate;
    each of the at least three arms comprising a second bearing element connected to the respective second end and adapted to be in contact with the ground;
    at least one of the at least three arms comprising a positioning device capable of modifying a distance between the respective second end and the second associated bearing element; and
    each of the at least three arms comprising a device for locking the respective arm in the second position.

* * * * *

UNITED STATES PATENT AND TRADEMARK OFFICE
CERTIFICATE OF CORRECTION

PATENT NO.         : 8,662,792 B2
APPLICATION NO.    : 13/058758
DATED              : March 4, 2014
INVENTOR(S)        : Jean-Luc Achard, Thomas Jaquier and Didier Imbault Page 1 of 1

It is certified that error appears in the above-identified patent and that said Letters Patent is hereby corrected as shown below:

Title page, item [73] Assignees: should read as follows:

Institut Polytechnique de Grenoble,
Grenoble Cedex 1, FRANCE and

Electricite de France
Paris, FRANCE

Signed and Sealed this
Seventeenth Day of March, 2015

Michelle K. Lee
*Director of the United States Patent and Trademark Office*